United States Patent Office 3,830,735
Patented Aug. 20, 1974

---

3,830,735
DEMULSIFICATION USING CATIONIC POLYVINYL ALCOHOLS
Andrew G. Tsuk, Laurel, Md., assignor to,
W. R. Grace & Co., New York, N.Y.
No Drawing. Application Jan. 8, 1971, Ser. No. 105,133, now U.S. Pat. 3,761,406, which is a division of Ser. No. 844,196, July 23, 1969, now abandoned. This application May 22, 1973, Ser. No. 362,710
Int. Cl. B01d 17/04
U.S. Cl. 210—43                                5 Claims

ABSTRACT OF THE DISCLOSURE

Cationic polyvinyl alcohol polymers of the class N,N-dialkylethylamino polyvinyl alcohol are useful flocculants for clays and demulsifiers for oil-water emulsions.

---

This application is a divisional application of U.S. Ser. No. 105,133, now U.S. Pat. 3,761,406, which in turn is a divisional application of U.S. Ser. No. 844,196, filed July 23, 1969, now abandoned.

BACKGROUND OF THE INVENTION

This invention relates to a method of producing a cationic polyvinyl alcohol. Such cationic polyvinyl alcohols are N,N-disubstituted aminoethyl ethers of polyvinyl alcohol. This invention also relates to the use of these cationic polyvinyl alcohols as flocculants and as oil demulsifiers. As flocculants, these cationic polyvinyl alcohols effectively coagulate clay and cellulosic suspensions. The flocculation of cellulosic suspension requires the addition of borax. As demulsifiers, these cationic polyvinyl alcohols break oil emulsions which resist conventional techniques such as acidification.

Polyvinyl alcohol belongs to that class of substances which are strongly hydrophilic. However, although strongly hydrophilic, polyvinyl alcohol is not readily dissolvable in water. Instead of dissolving a gel is formed. A substance having such gelation properties, is not generally useful as a flocculant or a demulsifier. In fact opposite uses would be expected, e.g., deflocculant or emulsifier. However, in the present invention, when polyvinyl alcohol is cationically modified a soluble form is produced which exhibits useful properties as a flocculant and as a demulsifier.

Various techniques have been attempted to substitute cationic groups for the alcoholic hydrogens of polyvinyl alcohol. The attempts to graft ethyleneimine side groups onto polyvinyl alcohol have failed to produce a cationic polyvinyl alcohol. However, the etherification of polyvinyl alcohol with β-halogenotertiary amines is effective in producing a cationic polyvinyl alcohol. This technique of producing such a modified polyvinyl alcohol is further in contrast to polymerizing a monomer which is itself cationically modified, and which will yield a cationic polyvinyl alcohol on polymerization.

Cationic polyvinyl alcohols being soluble in water are useful as flocculants for clays and cellulose. To flocculate a clay suspension, a dosage of cationic polyvinyl alcohol in only about a ratio of 0.1% of the clay need be added. To flocculate a cellulosic suspension, the cationic polyvinyl alcohol is added along with borate ion and the pH adjusted to about 8. The cellulose will slowly flocculate. This flocculation may be further enhanced by agitation which has the effect of increasing contact and the rate of flocculation. Cellulose is readily flocculated using a cationic polyvinyl alcohol dosage of about 1% of the cellulose present in suspension. Clay and cellulose suspensions are a problem to the paper, mining and other chemical process industries. Waste waters from these processes contain up to 1000 parts per million and more of clays and cellulose. These waters must be cleaned before entering a public waterway. The present invention offers an efficient and inexpensive method for removing these contaminants.

In use as a demulsifier the cationic polyvinyl alcohol is added in a dosage of about 0.1% of the aqueous emulsion. Upon standing, an oil upper layer and an aqueous lower layer separate out. The oil layer or phase is then removed by decantation. Oil-water emulsions are used in the metal working, ore processing and other related industries. Before disposal, these emulsions must be cleaned up. This will usually require the breaking of the emulsion. By breaking oil-water emulsions with the cationic polyvinyl alcohols of the present invention, the oil portion can be recovered in a substantially pure state and readily processed for re-use. The economy of re-use considerably reduces industry costs. This economy of re-use is of particular value to high volume users of cutting oils.

The prior art has not disclosed the preparation of N,N-disubstituted aminoethyl polyvinyl alcohols by the reaction of the polyvinyl alcohol with β-halogenotertiary amines. The preparation of a diethylaminoethyl cellulose (Biochemical Preparation, Vol. 8, p. 39) has been disclosed. However, polyvinyl alcohol is not of the same structure as cellulose, and it is more coincidence than expected, that polyvinyl alcohol in this instance will undergo a similar reaction. In regard to the use of these cationic polyvinyl alcohols as flocculants or demulsifiers the prior art is devoid of any reference. Polyvinyl alcohols have generally been used for their gelation properties as suspending and flotation agents. To cationically modify polyvinyl alcohol and use these polymers as flocculants and demulsifiers is new to the art.

It is an object of this invention to cationically modify polyvinyl alcohol.

It is further an object of this invention to use these cationically modified polyvinyl alcohols as demulsifying agents.

SUMMARY OF THE INVENTION

This invention consists in the etherification of polyvinyl alcohol with β-halogenotertiary amines to form N,N-disubstituted aminoethyl polyvinyl alcohols. These polyvinyl alcohols are cationic. The invention further consists in using these cationic N,N-substituted aminoethyl polyvinyl alcohols as flocculating agents and as demulsifiers. These cationic polyvinyl alcohols readily demulsify aqueous-oil emulsions as well as flocculating clay and cellulose suspensions.

DETAILED DESCRIPTION OF THE INVENTION

Broadly, the invention comprises the synthesis of a class of polyvinyl alcohols, and the use of these polyvinyl alcohols as flocculating agents and demulsifiers. The synthesis in its simplest form consists of the following etherification reaction:

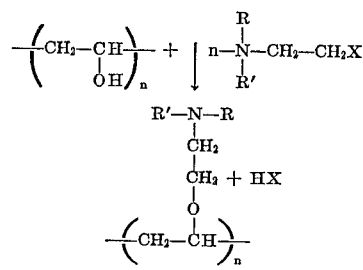

wherein X is a halogen and R and R' are lower alkyl and $n$ is an integer of from about 1 to about 4 designating the polymer chain length. In the reaction equation as set out mole equivalents hydroxyl

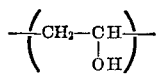

and N,N-disubstituted aminoethyl chloride are reacted. As practiced, the ratio of the mole equivalent of hydroxyl to N,N-disubstituted aminoethyl chloride may range from about 1 to 100. This gives a range of etherification of from about 1% to about 100% of the polyvinyl alcohol hydroxyl groups. Any ratio in this range will produce a cationic polyvinyl alcohol effective as a flocculating or a demulsifying agent.

The etherification reaction is conducted by contacting polyvinyl chloride and 2-halo, N,N-disubstituted ethylamine hydrochloride in the presence of sodium hydroxide. This mixture is heated from about 70° C. to about 100° C., followed by addition to an excess of boiling water and neutralized. The cationic substituted product readily goes into solution. The ratio of reactants is not critical. Higher concentrations of the 2-halo-N,N-disubstituted ethylamine hydrochloride will tend to etherify more hydroxyls. Cationic substitution of 2–10% of the hydroxyls will yield a cationic polyvinyl alcohol which is very effective as a flocculant and demulsifier.

The 2-halo-N,N-disubstituted ethylamine hydrochloride is preferably the 2-chloro or 2-bromo derivative. The N,N-disubstituted groups are lower alkyl of from 1–4 carbon atoms. The groups may be the same or different lower alkyl groups. The preferred species are 2-chloro-N,N-dimethyl ethylamine hydrochloride and 2-chloro-N,N-diethyl ethylamine hydrochloride.

These cationic polyvinyl alcohols are useful as flocculants for clay suspensions. Bentonite and kaolin clay suspensions are readily flocculated by dosages in the range of .01 to 0.2% by weight of the clay solids content. Higher dosages are also effective. On standing a lower solid and an upper aqueous layer forms. These are readily separated by decantation, filtration or both. Dosages of greater than 0.2% by weight of the clay solids are also effective, with the increased dosages generally increasing the rate of flocculation. Dosages of less than 0.01% are in some instances operable but the floc size and rate of flocculation decreases. Other clays such as hematite are readily flocculated by the cationic polyvinyl chloride.

In the flocculation of cellulosic suspensions borax must be added and the pH adjusted to above 7, and preferably to about 8. The borax of the composition is added as *meta*-boric acid or a compound which will yield *meta*-boric acid on hydrolysis such as the alkali or alkaline earth borates or *ortho*-boric acid. Of particular importance are the *meta* and tetraborates of the alkali and alkaline earth elements. The borax is added so as to preferably be in a stoichiometric excess.

The suspension can contain cellulose from 10 p.p.m. to 1000 p.p.m. and above. The flocculant can be added either as a composition of the cationic polyvinyl alcohol and borax, or the components added independently in any order. Neither the cationic polyvinyl alcohol nor borax alone will flocculate the cellulose suspension. The cationic polyvinyl alcohol alone will be absorbed by the cellulose but there will be no flocculation. Borax will not complex with or precipitate the cellulose. Flocculation will occur shortly after the cellulose suspension contains both the cationic polyvinyl alcohol and borax or borax yielding compound and the pH has been adjusted to above 7. At a pH of 7, flocculation will occur but slowly. As the pH is raised to about 8.5 the rate increases but with no further increase as the pH is raised past about 8.5. The pH can be adjusted by the use of alkali hydroxides, e.g., sodium hydroxide to raise the pH, or boric acid to lower the pH.

The cationic polyvinyl alcohol is preferably added to be in a concentration of from about 1% to about 6% of the cellulose concentration. The borax is added so as to be in a concentration from about 15% to about 40% by weight of the cellulose in suspension. High concentrations of the cationic polyvinyl alcohol and borax will increase the flocculation rate while lesser concentrations will generally not be effective. However, as the parts per million of cellulose increases, it is necessary to add a corresponding amount of cationic polyvinyl alcohol and borax.

The flocculation is not temperature sensitive and this need not be considered a factor.

Upon completion of flocculation, the settled cellulose can be removed by filtration, or a decantation of the water or both. Prior to decantation, the cellulose may be further settled by centrifugation.

In the use of a demulsifier for oil-water emulsions a dosage in the range of about 2% by volume of the oil content of the emulsion will break the emulsion. On the addition of about 0.01 to about 0.5% by volume of cationic polyvinyl alcohol to a 5% aqueous cutting oil emulsion an upper oil layer and a lower aqueous layer readily separate out. A dosage of about 0.1% is preferred. Agitation is not necessary, but it will substantially increase the rate of demulsification by increasing the rate of molecule contact. This emulsion containing demulsifier on sitting forms two distinct phases. The original white cloudy emulsion forms a brown upper oil phase and a clear lower water phase. These phases are readily separated by tapping off either phase, decantation, centrifugation or a combination of these techniques.

The dosage of about 2% for demulsification represents a generally preferred dosage. Higher dosages will also effectively demulsify the emulsion as would be expected. Lower dosages will generally partially demulsify the oil-water emulsions. The dosage of 2% is particularly effective for demulsifying cutting oils which consist of a class comprising the sulfonated oils, polyalkylene glycols and fatty soaps.

The following examples are set out to further amplify the invention.

Example 1

Commercial grade polyvinyl alcohol (12 g.) is mixed with 6 g. 2-chloro-N,N-dimethyl ethylamine hydrochloride. Then 16 g. of a 50% (by weight) NaOH solution is added, with intense mixing. The mixture is maintained at over 90° C. for one hour, during which its color turns dark brown. The mixture is then dumped into 600 ml. of boiling water and boiled gently for 1–2 hours. This solution is neutralized with HCl. The brown supernate is decanted off from any settled insolubles. This solution is used for coagulation and demulsification purposes.

Example 2

Commercial grade polyvinyl alcohol (12 g.) is mixed with 6 g. of 2-chloro-N,N-diethyl ethylamine hydrochloride, then 16 g. of a 50% (by weight) NaOH solution is added, with intense mixing. The mixture is maintained at over 90° C. for one hour, during which its color turns dark brown. The mixture is then dumped into 600 ml. of boiling water, and boiled gently for 1–2 hours. This solution is neutralized with HCl. The brown supernate is decanted off from any settled insolubles. This solution is used for coagulation and demulsification purposes.

Example 3

To an aqueous cellulosic suspension containing 300 p.p.m. wood flour is added a solution of cationic polyvinyl alcohol sufficient to insure an added polymer dosage of 4–9 p.p.m. in the suspension. After brief stirring about 100 p.p.m. borax is added, and, if necessary sufficient alkali to bring the pH to about 8. Upon gentle stirring, the cellulosic suspension soon coagulates into large flocs.

Example 4

To an aqueous cellulosic suspension containing 300 p.p.m. paper pulp is added a solution of cationic polyvinyl alcohol sufficient to insure an added polymer dosage of 4–9 p.p.m. in the suspension. After brief stirring about 100 p.p.m. borax is added, and, if necessary sufficient alkali to bring the pH to about 8. Upon gentle stirring, the cellulosic suspension soon coagulates into large flocs.

Example 5

To an aqueous cellulosic suspension containing 300 p.p.m. cotton linters is added a solution cationic polyvinyl alcohol (as described above) sufficient to insure an added polymer dosage of 4–9 p.p.m. in the suspension. After brief stirring about 100 p.p.m. borax is added, and if necessary, sufficient alkali to bring the pH to about 8. Upon gentle stirring, the cellulosic suspension soon coagulates into large flocs.

Example 6

To an aqueous suspension of 300 p.p.m. bentonite (Volclay, 625 mesh, American Collid) is added a solution of cationic polyvinyl alcohol sufficient to insure an added polymer dosage of 0.5 p.p.m. in the suspension. Upon gentle stirring, the suspension coagulates into large flocs. The flocculant precipitate is separated by filtration.

Example 7

To an aqueous suspension of hematite slime (containing about 1% solids, Quebec Cartier Mining Co., Gagnon) is added to a solution of cationic polyvinyl alcohol sufficient to insure an added polymer dosage of 1 p.p.m. in the suspension. Upon gentle stirring, coarse red aggregates form in the suspension, which settle rapidly, and leave a slightly hazy supernate, suitable for reutilization in the mine.

Example 8

In this example, a cationic polyvinyl alcohol prepared from a low viscosity, incompletely hydrolyzed commercial polyvinyl alcohol (Elvanol 51–03) is used. A 5% aqueous emulsion of DuBois 930 Cutting Oil, which resists conventional attempts of emulsion breaking, like acidification, is broken by the addition of cationic polyvinyl alcohol (0.1% added dosage or less) and moderate stirring. Upon standing an upper oily layer separates. The phases are separated by decantation.

What is claimed is:

1. The method of demulsifying an aqueous oil emulsion comprising:
   (a) adding from about .01 percent to about 2 percent by volume of a demulsifying agent consisting essentially of a cationic polyvinyl alcohol polymer to an aqueous oil emulsion;
   (b) allowing a water phase and an oil phase to form; and
   (c) separating said phases.

2. The method as in Claim 1 wherein said cationic polyvinyl alcohol polymer is selected from the group consisting of N,N-dimethyl ethylamino polyvinyl alcohol and N,N-diethylethylamino polyvinyl alcohol.

3. The method of Claim 1 wherein said polymer is added to be in a concentration of from about 0.01 percent to about 0.5 percent by volume of said aqueous oil emulsion.

4. The method as in Claim 3 wherein said oil emulsion is a cutting oil emulsion.

5. The method as in Claim 1 wherein said phases are separated by decantation.

References Cited

UNITED STATES PATENTS 3,497,450  2/1970  Roth _____ 210—Dig 21
3,729,410  4/1973  Abadie et al. _____ 210—40

CHARLES N. HART, Primary Examiner

BENOIT CASTEL, Assistant Examiner

U.S. Cl. X.R.

210—54, Digest 21; 252—329, 358